Sept. 15, 1931.  C. H. WHITE  1,823,244
PLANTER
Filed June 13, 1927   3 Sheets-Sheet 1
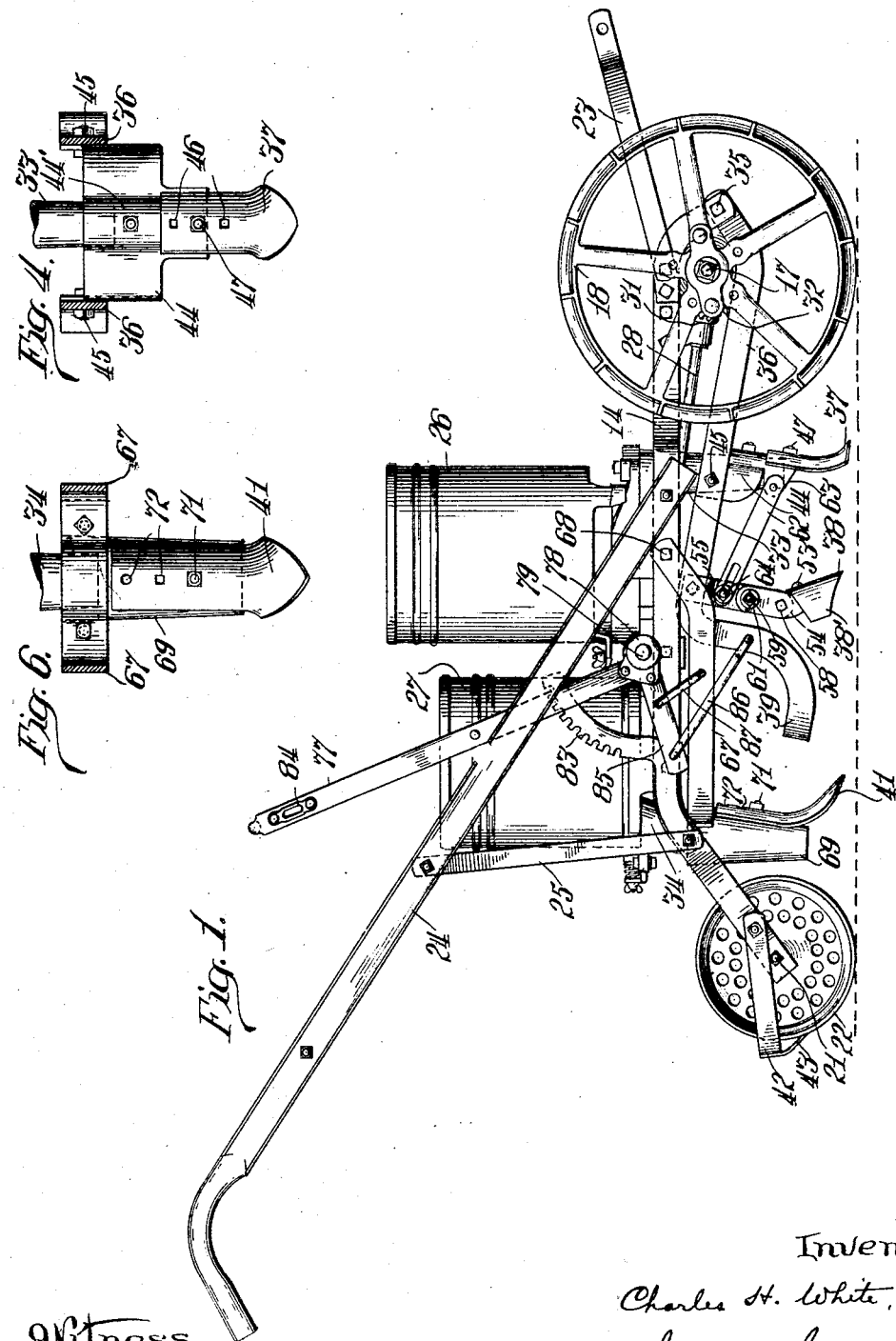
Inventor
Charles H. White,
By John L. Jackson.
Attorney.

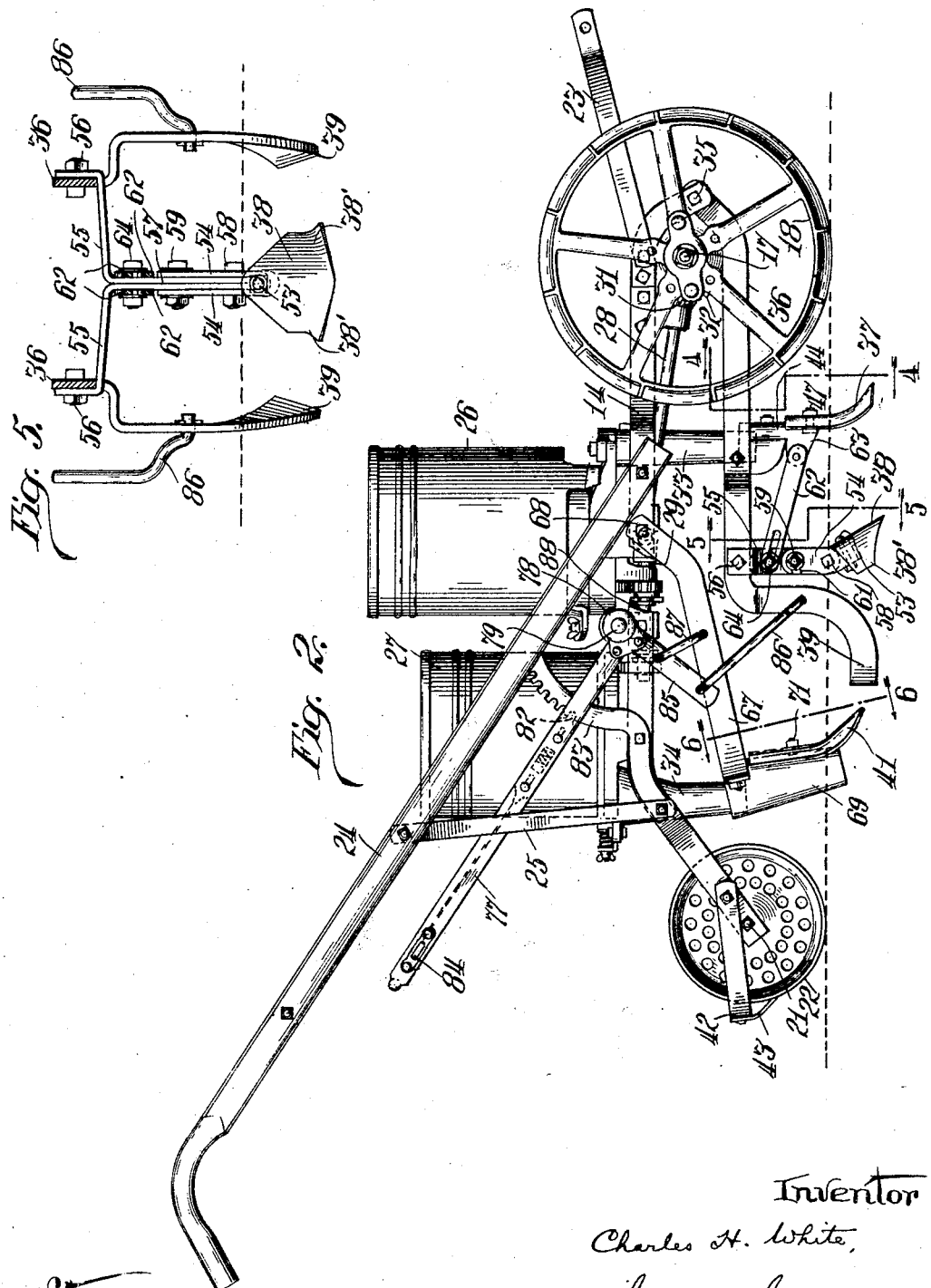

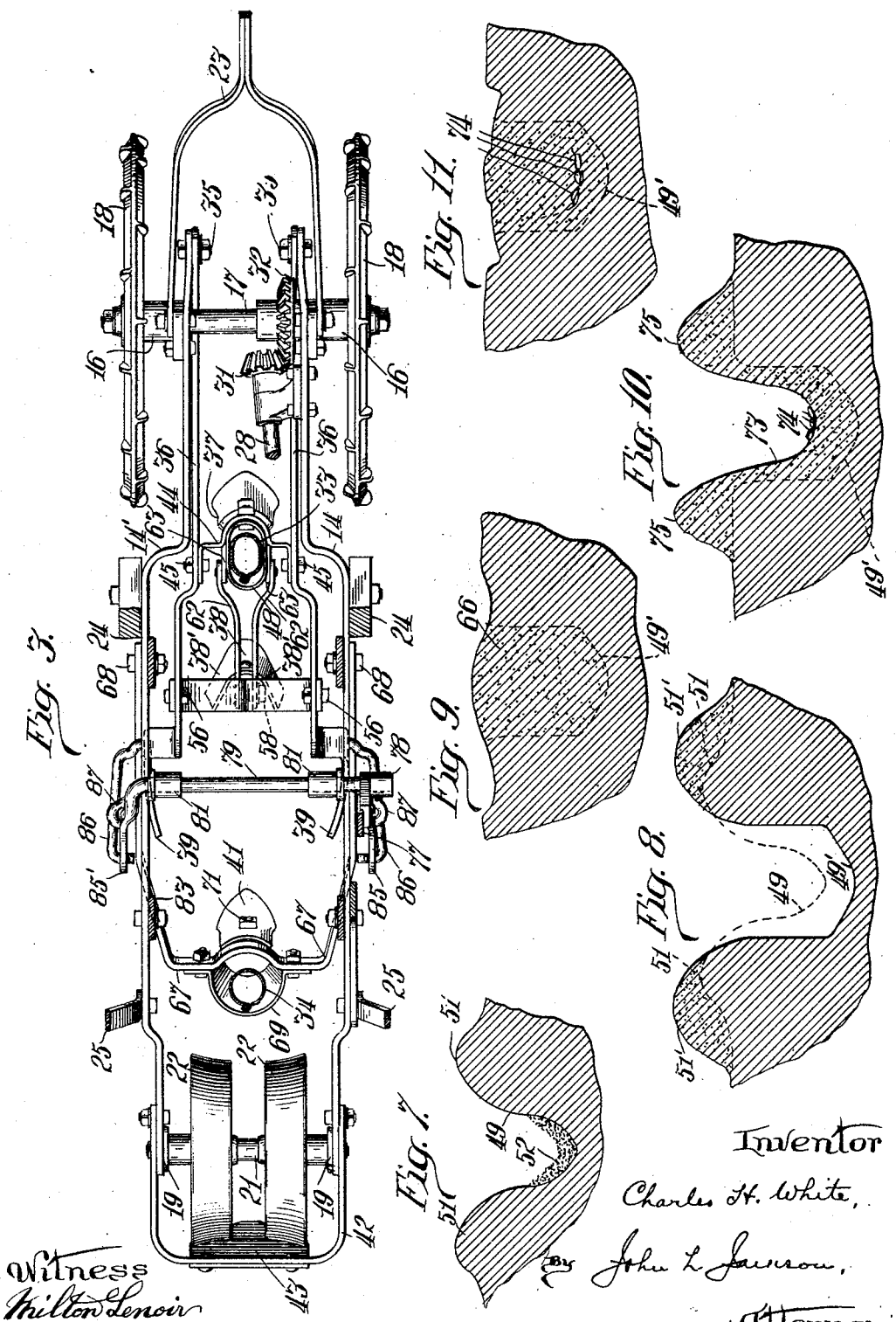

Patented Sept. 15, 1931

1,823,244

UNITED STATES PATENT OFFICE

CHARLES H. WHITE, OF MOLINE, ILLINOIS, ASSIGNOR TO DEERE & COMPANY, OF MOLINE, ILLINOIS, A CORPORATION OF ILLINOIS

PLANTER

Application filed June 13, 1927. Serial No. 198,357.

The present invention relates to planters, and has particular reference to planting implements of that type which distribute fertilizer along with the planting operation.

The most commonly followed practice of distributing fertilizer concurrently with the planting of the seed is to drill the fertilizer into the seed bed in such proximity to the seed that a minimum quantity of fertilizer will be of maximum benefit in the germination of the seed and in supplying the properties of the fertilizer to the growing crop. In such distribution of the fertilizer, however, it is not generally desirable that the fertilizer in its full strength be in direct contact with the seed in the bed.

One of the objects of the present invention is to provide an improved method of distributing fertilizer and planting seed wherein the fertilizer is first intimately mixed with a quantity of soil, which mixture of soil and fertilizer is imbedded in a furrow, and the seed thereafter sowed in this bed of mixed soil and fertilizer. The result of such method is that the seed is planted in a bed of intimately mixed soil and fertilizer, so that the fertilizer is retained in proximity to the seed but does not contact with the seed in any concentrated quantities.

Another object of the invention is to provide a planter characterized by an improved arrangement and construction of earth-working devices for performing the above method of distributing the fertilizer and planting the seed. Other objects pertaining to the specific features of construction of the present planter will be apparent from the following description of one preferred embodiment of the invention.

In the drawings illustrating this embodiment:

Figure 1 is a side elevational view of the present planter, showing the furrow openers and scrapers in raised position.

Figure 2 is a similar view showing the furrow openers and scrapers in their lower, operative positions.

Figure 3 is a plan section showing the construction of the main frame and the mounting of the furrow openers and scrapers thereon.

Figure 4 is a detail sectional view taken on the plane of the line 4—4 of Figure 2, illustrating the first furrow opener.

Figure 5 is a similar sectional view taken on the plane of the line 5—5 of Figure 2, illustrating the second furrow opener and the scraping blades.

Figure 6 is also a similar view illustrating the third furrow opener; and

Figures 7 to 11 inclusive are views illustrating successively the different operations performed by the furrow openers, scraping blades and covering wheels.

The frame of the planter preferably comprises two longitudinally extending frame bars 14—14' which have bearings 16 bolted to their front ends for receiving the axle 17 of the front wheels 18 (Figure 3). The downwardly turned rear ends of the frame bars 14—14' have bearings 19 secured thereto for receiving the axle 21 of the rear covering wheels 22. Pivotally connected to the front end of the frame is a U-shaped draft member 23 adapted for connection with any suitable draft hitch. Bolted to the sides of the frame are upwardly inclined handle bars 24 which are braced by struts 25 extending down to the rear portion of the frame, such handle bars serving to aid in guiding the implement. Mounted on the top of the frame are two containers or hoppers 26 and 27 which contain the fertilizer and the seed respectively. Associated with each of these hoppers is a suitable feeding device for governing the feed of the fertilizer and of the seed. Such feeding devices do not constitute any part of the present invention, and it will be understood that any preferred feeding devices, suitable for the purpose, may be employed.

The traction power of the planter is utilized to drive such feeding devices through an inclined shaft 28 which has operative connection through a universal joint or otherwise with horizontal shaft 29 extending below the hoppers, on which horizontal shaft the feeding devices are mounted. The inclined shaft 28 carries a bevel pinion 31 at its forward end (Figure 3) which meshes with a bevel gear 32 mounted on the front axle 17, and driven by one or both of the front traction wheels 18. The fertilizer is discharged from its hopper 26, under the control of its feed regulating device, down into front spout 33, and the seed is similarly discharged down into a rear spout 34.

Referring to Figure 1, it will be seen that the front ends of the frame bars 14—14' curve downwardly beyond the front axle 17 and carry pivot bolts 35 to which the upwardly curved ends of two bars 36 are pivoted. Such bars extend rearwardly in parallel spaced relation under the main frame and form a swinging frame or beam structure for supporting the first two furrow openers 37 and 38. The end portions of said bars are also turned downwardly and deflected inwardly to form covering blades or arms 39 which serve to deflect the upturned ridges of earth at each side of the furrow back into the furrow in a covering or refilling operation. The first two furrow openers 37 and 38 are in series; also supported in rear of covering blades 39, and in series with said first two furrow openers, is a third furrow opener 41. The two covering wheels 22 follow directly in rear of this latter furrow opener 41. For scraping clods of earth from said covering wheels a swinging bail 42 may be pivotally connected to the side frame members and provided with a scraper 43 engaging the peripheries of the wheels.

The three furrow openers 37, 38 and 41 are preferably in the form of shovels, although it will be obvious that other types of furrow openers might be employed. The first shovel 37 is mounted on a supporting member in the form of a curved yoke 44 which has laterally bent end portions bolted to the swinging bars 36 at 45 (Figure 3). The shank portion of the shovel is curved cylindrically to embrace the correspondingly curved shank portion 44' of the supporting yoke and is provided with a plurality of bolt holes 46 for receiving the fastening bolt 47 which secures the shovel to the yoke. The several bolt holes 46 permit the shovel to be set at different heights relative to the yoke 44 for varying the depth of the furrow cut by the shovel. By virtue of the engagement of the curved shank portion of the shovel over the beaded or curved portion 44' of the yoke, the shovel is held against lateral swinging and hence a single bolt is adequate to hold the shovel on the yoke. Secured within the curved portion of the yoke, in rear thereof, is a band 48, preferably flattened in the form of an elongated loop (Figure 3), such band embracing the lower end of the fertilizer spout 33. This first shovel 37 opens the initial furrow in the soil, as indicated at 49 in Figure 7, the soil turned up out of such furrow forming ridges or hills 51 on both sides thereof. Into such furrow a regulated quantity of fertilizer 52 is dropped through the fertilizer spout 33, discharging immediately behind the shovel.

The second shovel opener 38 is also preferably in the form of a shovel or sweep, this second shovel, however, having wing portions 38' which project laterally to a greater width than the first furrow opener 37, as best shown in Figure 3. The second furrow opener is bolted at 53 to the looped lower end of a U-shaped arm or bracket 54 (Figure 5). Such arm has mounting on a bracket consisting of duplicate angle brackets 55 which are bolted at their outer ends to the outer sides of the swinging lift bars 36 as indicated at 56. The inner ends of such angle brackets are bent downwardly and about back to back to form a depending arm portion 57. The U-shaped arm 54 embraces this depending arm portion and is pivoted to the lower end thereof on a bolt 58, whereby the face of the shovel 38 is capable of a limited angular adjustment relative to the bracket arm 57. The upper ends of the shovel-supporting arm 54 are clamped to the sides of the bracket arm 57 by a bolt 59 which passes through both arms. To permit the aforesaid angular adjustment of the shovel-supporting arm relative to the bracket arm, both side portions of the shovel-supporting arm are provided with curved slots 61 through which the bolt 59 extends, such slots preferably opening outwardly at the rear edges of the side arm portions 54. The supporting bracket 55—55 also has pivotal adjusting movement about the bolts 56, whereby such supporting bracket together with the shovel 38 can be adjusted fore and aft relative to the lifting bars 36. The supporting bracket is held in any desired fore and aft position by two spaced parallel links 62 which are pivotally connected at their front ends to lugs 63 projecting back from the mounting yoke 44 of the first shovel. The rear ends of the links 62 embrace opposite sides of the depending bracket arm 57, and are slotted to receive a clamping bolt 64 which passes through both slots and through the arm 57. It will be evident that the slotted links 62 will permit the mounting bracket and shovel to be swung fore and aft for different desired settings of the shovel, and that by tightening the bolt 64 the links 62 will be rigidly clamped to the mounting bracket and will serve as a rigid strut for holding the bracket at its desired angle against reaction stresses set up in the shovel. The desired setting of the second shovel 38 is such that it will deepen the initial furrow 49 cut by the first shovel and will also widen this furrow, such widening resulting from the sweep of the side portions 38'. The action of the second shovel is illustrated in Figure 8, the deeper and wider furrow cut thereby being indicated at 49'. In passing through the furrow the second shovel throws the fertilizer 52 up to the sides of the furrow, and in cutting more soil from the furrow it also throws said soil up along the sides of the furrow, the soil and fertilizer together forming the relatively high ridges 51'.

The covering arms or blades 39 are disposed outwardly from the sides of the second shovel and in rear thereof, such blades having an inward twist as best shown in Figure 5. These blades operate to scrape or deflect the ridges 51' back into the furrow 49', refilling the furrow substantially as shown in Figure 9, wherein 66 indicates the mixed mass of soil and fertilizer which has been scraped back into the furrow.

The third furrow opener 41 is preferably constructed in the form of a shovel designed to cut a relatively narrow furrow, similar to the first shovel 37. Such third shovel is supported on a separate lifting frame structure comprising a U-shaped bar 67, the forward arm portions of which are pivotally connected to the main frame bars 14—14' on pivot bolts 68. Bolted to the transverse portion of this swinging frame member is a sleeve-like spout portion 69. The shovel has a cylindrically curved shank portion which is secured by a bolt 71 to the cylindrically curved front side of the spout member 69. The shovel shank may be provided with a plurality of holes 72 for permitting different depth adjustments of the shovel relative to its lifting frame 67, similar to the front shovel 37. The spout member 69 has telescopic engagement over the grain spout 34 in the raising and lowering movement of the swinging frame 67, such spout member serving as an extension for directing the seed into the furrow cut by the third shovel at a point immediately behind the shovel. The action of the third shovel is illustrated in Figure 10, from which it will be noted that it cuts a relatively narrow furrow 73 through the mass of mixed soil and fertilizer 66, which has previously been scraped back into the initial furrow by the blades 39, as before described. The setting of the third shovel is preferably such that its furrow 73 is shallower than the initial furrow 49 of the first shovel so that a mixed mass of soil and fertilizer extends down from the bottom of the furrow 73 to a considerable depth to serve as a bed for receiving the seeds 74. The covering wheels 22 which track behind the third shovel act to throw the raised ridges 75 of mixed soil and fertilizer back into this last opened furrow 73, closing the furrow over the seed as indicated in Figure 11.

The three shovels together with the covering blades 39 are adapted to be swung into and out of operative position and to be adjusted to different working depths through the operation of a hand lever 77. A hub 78, which is riveted to the lower end of such hand lever, is secured to the end of a transversely extending shaft 79, which has bearing support in bearing brackets 81 (Figure 3) secured to the opposite frame bars 14—14'. The hand lever carries a latching dog 82 which is adapted to engage in a notched quadrant 83 secured to the main frame, so as to hold the lever in any adjusted position. This latching dog is adapted to be released through a suitable handle 84 mounted on the outer end of the hand lever 77. Extending downwardly from the hub 78 is an arm 85, and extending downwardly from the shaft 79 at the opposite side of the machine is a corresponding arm 85', the latter being shown as a bent extension of the shaft 79. Links 86 are pivotally connected between the ends of these arms, and the downwardly turned end portions of the lifting bars 36. A second pair of links 87 is pivotally connected between the arms 85—85' and the secondary lifting bars 67 which support the rear shovel 41. It will be evident that when the hand lever 77 is swung down the shovels and covering blades will be lowered to working position, as shown in Figure 2, and when the hand lever is swung upwardly the shovels and covering blades will be lifted to a transport position, clear of the ground, as shown in Figure 1. Different planting depths may be obtained by the proper settings of the hand lever 77, and for any of such settings the three shovels may be adjusted relatively to each other, as before described, for obtaining the proper relation of cutting depths between the shovels. The movement of the hand lever 77 to raised position for lifting the shovels and covering blades from the soil may also be arranged to interrupt the operation of the fertilizer and seed feed mechanisms, as by the provision of a suitable clutch collar 88 on the horizontal feeding shaft 29, which clutch collar can be actuated by a suitable shifting fork moving with the shaft 79.

Referring again to Figures 7 to 11 inclusive, it will be seen that the discharge of the fertilizer 52 into the initial furrow 49 will bring such fertilizer into association with sub-surface soil and will also tend to prevent scattering of the fertilizer by any prevailing wind. The next succeeding step of deepening and widening the furrow will cut additional soil from the furrow and will throw such soil and fertilizer up along the sides of the furrow, resulting in an intimate mixing of such upturned soil and fertilizer. The next succeeding step of scraping the mixed mass of soil and fertilizer back into the furrow, as illustrated in Figure 9, will aid in effecting further mixing of the soil and fertilizer. Thereafter, the step of opening the relatively shallow furrow 73 in the mixed mass of soil and fertilizer, as shown in Figure 10, will also aid in mixing the soil and fertilizer. As before remarked, the sides and bottom of this last opened furrow are lined with a mixture of soil and fertilizer, and into such furrow the seed is dropped. Finally the step of throwing the ridges 75 of mixed soil and fertilizer back into the furrow, over the seed, will result in further mixing of the soil and fertilizer. The final result of these successive steps is that the particles of fertilizer are intimately mixed with the soil and are distributed more or less uniformly throughout the mass of soil; also, that the seed is planted directly in a bed of this intimately mixed soil and fertilizer. Such mode of planting is made feasible because of the thorough distribution of the fertilizer through the mass of soil, whereby there can be no concentrated quantities of the fertilizer in direct contact with the seed.

While I have shown what I consider to be the preferred apparatus for carrying out my invention, it will, of course, be understood that such is merely exemplary, and can be modified and rearranged without departing from the scope of the invention.

What I claim as my invention and desire to secure by Letters Patent is:

1. The method of distributing fertilizer and planting seed which comprises opening a furrow, mixing fertilizer with the soil turned up from said furrow, refilling the furrow with the mixed fertilizer and soil, opening a second furrow in such mixture, and planting the seed therein.

2. The method of distributing fertilizer and planting seed which comprises opening a furrow, depositing fertilizer in said furrow, turning said fertilizer and additional soil out of said furrow, refilling the furrow with the mixed soil and fertilizer, opening a second furrow in such mixture, and planting the seed therein.

3. The method of planting and distributing fertilizer which comprises opening a furrow, distributing fertilizer in said furrow, cutting additional soil from said furrow and throwing the same together with said fertilizer up into ridges on the sides of said furrow, scraping the mixture of soil and fertilizer back into said furrow, opening a second furrow in said mixed soil and fertilizer, dropping the seed therein, and closing said latter furrow over said seed with said mixed soil and fertilizer.

4. In a planter of the class described, the combination of a first furrow opener, means for delivering fertilizer behind said furrow opener, a second furrow opener arranged to enlarge the furrow made by said first furrow opener, said second furrow opener mixing the fertilizer with the soil turned up out of said furrow, means for deflecting the mixed soil and fertilizer back into said furrow, a third furrow opener for cutting a second furrow in the mixed soil and fertilizer, means for delivering seed to said second furrow, and means for covering the seed in said second furrow.

5. In a planter of the class described, the combination of a first furrow opener, means for delivering fertilizer directly behind said furrow opener, a second furrow opener set deeper than said first furrow opener and arranged to eject said fertilizer together with the soil turned up from said furrow, scraping members disposed at each side of said furrow for scraping the mixture of the fertilizer and soil back into said furrow to form a bed of mixed soil and fertilizer therein, a third furrow opener arranged for cutting a second furrow in said bed of mixed soil and fertilizer, means for delivering seed into said second furrow, and means for covering the seed in said second furrow.

6. In a planter, the combination of a first furrow opener, means for delivering fertilizer behind said furrow opener, a second furrow opener set to run deeper than said first furrow opener, scraping means for refilling the furrow with the mixed soil and fertilizer turned up by said second furrow opener, a third furrow opener set to cut a relatively shallow furrow in the mixed soil and fertilizer, means for delivering seed to said second furrow, and means for covering the seed in said second furrow.

7. In a planter, the combination of a first furrow opener, means for delivering fertilizer into the furrow cut by said opener, a second furrow opener set to run deeper than said first furrow opener, a scraping blade for scraping the mixed soil and fertilizer turned up by said second furrow opener back into said furrow, a third furrow opener set to run shallower than said first furrow opener for cutting a second furrow in the mixed soil and fertilizer, means for delivering the seed to said second furrow, and a rotating covering wheel for covering the seed in said second furrow.

8. In a planter, the combination of a first shovel for opening in initial furrow, means for delivering fertilizer into said furrow immediately behind said shovel, a second shovel arranged in series behind said first shovel and set to cut deeper than said first shovel, scraping blades in rear of said second shovel and arranged to scrape the ridges of mixed soil and fertilizer turned up by said second shovel back into said furrow, a third shovel arranged in series with said first and second shovels and in rear of said scraping blades, said third shovel being set to run shallower than said first shovel for opening a second furrow in the mixed soil and fertilizer, means for delivering the seed to said second furrow, and covering means for deflecting the ridges of mixed soil and fertilizer turned up by said third shovel back into said second furrow over the seed.

9. In a planter, the combination of seed feeding means, fertilizer distributing means, three furrow openers arranged in series and coacting with said seed feeding and fertilizer distributing means, means between the second and third furrow openers for filling the furrow cut by the first and second furrow openers, and means for simultaneously raising and lowering said three furrow openers.

10. In a planter, the combination of a wheeled main frame, a lifting bar pivotally connected to said main frame, a pair of shovels arranged in series and supported on said lifting bar, a second lifting bar pivotally connected to said frame, and a third shovel carried by said second lifting bar and arranged in series alinement with said first mentioned shovels.

11. In a planter, the combination of a wheeled main frame, a lifting frame pivotally connected to said main frame adjacent to the front end of the latter, first and second shovels arranged in series and supported on said lifting frame, scraping blades extending from the rear end of said lifting frame, a second lifting frame pivotally connected to said main frame, a third shovel carried by said second lifting frame and arranged in series alinement with said first and second shovels, and operating means connected to raise and lower both of said lifting frames simultaneously.

12. In a planter, the combination of a main frame, a traction wheel at the front end of said frame, a covering wheel at the rear end of said frame, a pair of laterally spaced lifting bars pivotally connected to the front end of said main frame, a supporting bracket extending between said lifting bars, a first shovel secured to said supporting bracket, means for discharging fertilizers in rear of said first shovel, a second supporting bracket pivotally connected to said bars for fore and aft swinging movement, an arm pivotally connected to said second bracket, a second shovel carried by said arm and disposed in series behind said first shovel, means for clamping said second bracket in different angular adjustments, means for clamping said arm in different angular adjustments relative to said second bracket, covering blades extending downwardly from the rear ends of said bars, a U-shaped lifting frame having its ends pivotally connected to said main frame, a third shovel carried by said lifting frame and arranged in series behind said first and second shovels, means for discharging seed in rear of said second shovel, and an adjusting lever having linked connection with said lifting bars and with said lifting frame for raising and lowering said shovels and said scraping blades simultaneously.

13. In a planter, the combination of a frame, a wheel supporting the front end of said frame, a first lifting bar pivotally connected to the front end of said frame, first and second shovels arranged in series on said lifting bar, a scraping blade on said lifting bar in rear of said first and second shovels, a second lifting bar pivotally connected to said frame, a third shovel supported by said second lifting bar and disposed in rear of said scraping blade, and a covering wheel supporting the rear end of said frame and traveling in rear of said third shovel.

14. In a planter, the combination of a frame, a wheel supporting the front end of said frame, a first lifting bar pivotally connected to the front end of said frame, first and second shovels arranged in series on said lifting bar, a scraping blade on said lifting bar in rear of said first and second shovels, means for adjusting said first and second shovels fore and aft relative to said first lifting bar to vary the depth of penetration thereof, a second lifting bar pivotally connected to said frame, a third shovel supported by said second lifting bar and disposed in rear of said scraping blade, means for adjusting said third shovel relative to said second lifting bar to vary the depth of penetration thereof, and a covering wheel supporting the rear end of said frame and traveling in rear of said third shovel.

15. The method of distributing fertilizer and planting seed which comprises opening a furrow, mixing fertilizer and soil turned up from the furrow, and planting the seed in the mixed fertilizer and soil replaced in the furrow.

16. The method of distributing fertilizer and planting seed which comprises opening a furrow, depositing fertilizer in said furrow, turning said fertilizer and additional soil out of said furrow, replacing mixed soil and fertilizer in said furrow, and planting the seed in said mixture.

17. The method of distributing fertilizer and planting seed which comprises opening a furrow, mixing fertilizer with the soil turned up from said furrow, depositing in the furrow mixed fertilizer and soil to form a bed of intimately mixed portions of the same, and planting seed to the proper depth in said bed.

18. The method of distributing fertilizer and planting seed which comprises opening a furrow, mixing fertilizer with the soil turned up from said furrow, depositing in the furrow mixed fertilizer and soil to form a bed of intimately mixed portions of the same, planting the seed in the furrow, and covering the seed with mixed fertilizer and soil.

19. The method of planting and distributing fertilizer which comprises opening a furrow, distributing fertilizer in said furrow, cutting additional soil from said furrow and throwing the same together with said fertilizer up into ridges on the sides of said furrow, scraping a mixture of soil and fertilizer back into said furrow to the planting depth of the seed, depositing the seed in said furrow, and closing said furrow over said seed with mixed soil and fertilizer.

CHARLES H. WHITE.